Dec. 3, 1940.　　　J. A. WALLER ET AL　　　2,223,772
CULINARY DEVICE
Filed Jan. 2, 1940　　　2 Sheets-Sheet 1
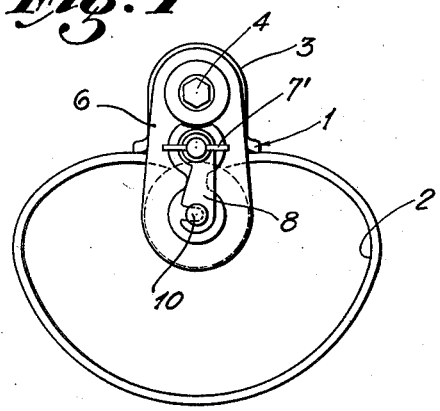
Fig. 1
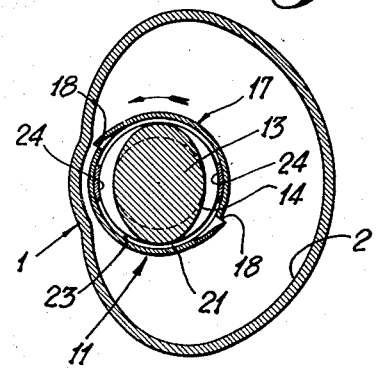
Fig. 4
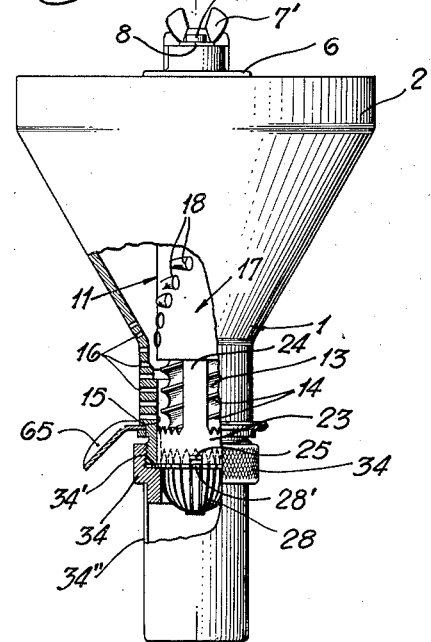
Fig. 2
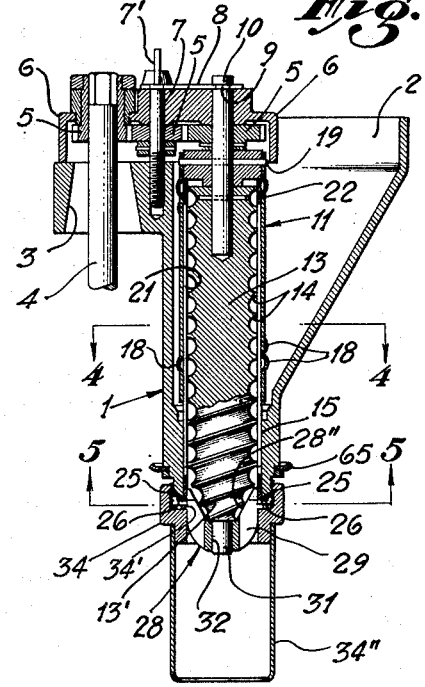
Fig. 3
Fig. 5
John A. Waller and
Charles E. Mockbee,
Inventors;
Attorney.

Dec. 3, 1940.  J. A. WALLER ET AL  2,223,772
CULINARY DEVICE
Filed Jan. 2, 1940   2 Sheets-Sheet 2
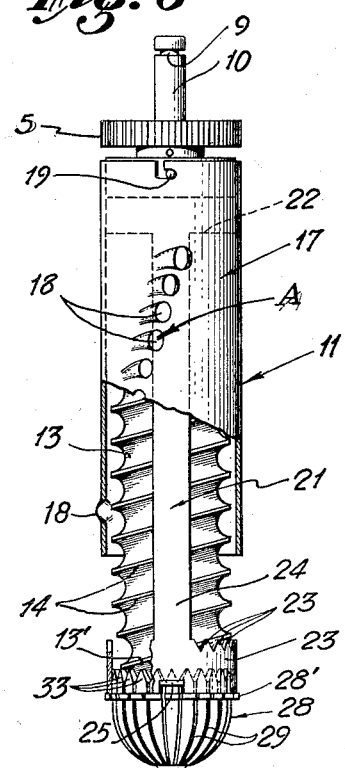
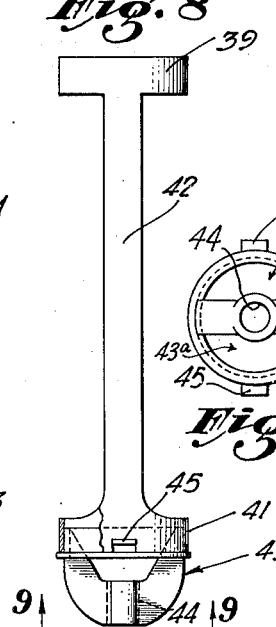
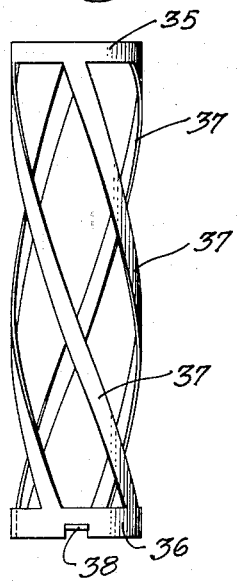
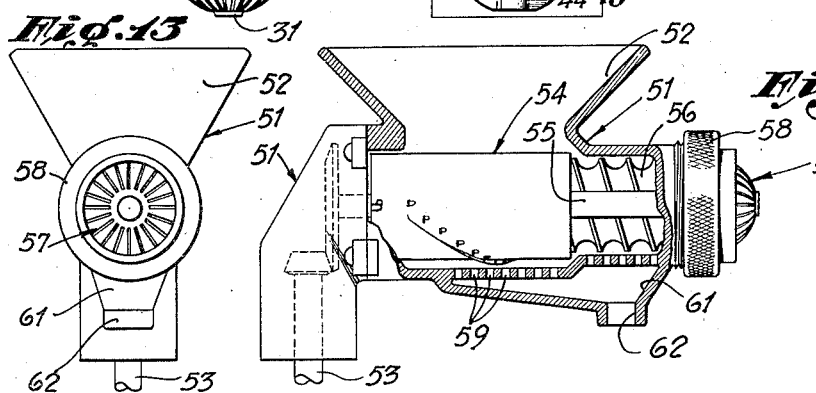
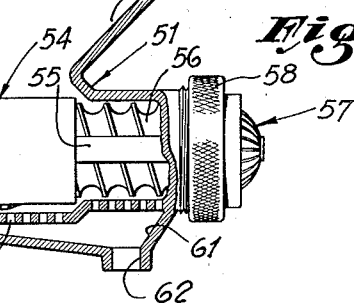
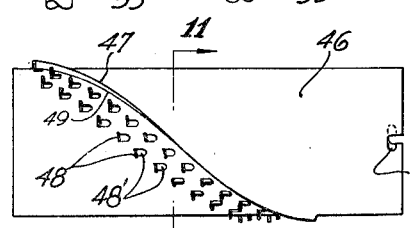
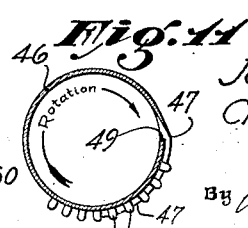
JOHN A. WALLER and
CHARLES E. MOCKBEE,
Inventors;
Attorney.

Patented Dec. 3, 1940

2,223,772

UNITED STATES PATENT OFFICE 2,223,772

CULINARY DEVICE

John A. Waller, Beverly Hills, and Charles E. Mockbee, Los Angeles, Calif.

Application January 2, 1940, Serial No. 311,990

10 Claims. (Cl. 100—48)

This invention relates to culinary devices, and pertains particularly to a comminuting device adapted to grate a fruit or vegetable or to pulp such a fruit or vegetable and express the juice therefrom.

One of the particular objects of the invention is to provide a culinary comminuting device adapted to express the juice from a fruit or vegetable, which is adapted particularly to use with a power-driven kitchen mixing appliance, as an accessory thereto.

The device of the present invention comprises, essentially, a body member defining a receptacle adapted to receive pieces of the material to be comminuted, a rotary comminuting element disposed within said member and adapted to engage such pieces and scrape or cut portions therefrom, and a compression member cooperating with said rotary comminuting element and adapted, at the will of the operator, to further comminute such portions and to express the juice from such portions and separately discharge both juice and the comminuted pulp.

A further particular object of the invention is to provide a device of the character described, which is equally adapted to the production of juice from a fruit or vegetable, or the comminution of meats or such fruit or vegetable in the formation of a ground or "grated" product.

A further object of the invention is to provide a culinary device of the character described, which is of simple and inexpensive construction, and which is easy to use.

Other objects and features of the invention will be brought out in the ensuing description of certain preferred embodiments thereof, or will be apparent from such description.

The accompanying drawings illustrate such embodiments, and referring thereto:

Fig. 1 is a plan view of one form of device;

Fig. 2 is a front elevation thereof, partly broken away to show the internal construction;

Fig. 3 is a longitudinal section taken on line 3—3 in Fig. 2;

Fig. 4 is a transverse section taken on line 4—4 in Fig. 3;

Fig. 5 is an inverted transverse section taken on line 5—5 in Fig. 3;

Fig. 6 is a partly broken away detail view of the cutter assembly employed in the form shown in Figs. 1 through 5;

Fig. 7 is a detail of one form of feeding element which may be used in the cutter assembly shown in Fig. 6;

Fig. 8 is a side elevation of a further modification of a feeding element useful in the invention;

Fig. 9 is a bottom plan veiw thereof taken on line 9—9 in Fig. 8;

Fig. 10 is a side elevation of a modified form of a cutting sleeve which may be used in the cutting assembly shown in Fig. 6;

Fig. 11 is a transverse sectional view thereof taken on line 11—11 in Fig. 10;

Fig. 12 is a partly broken away side elevation of a modified form of the device; and Fig. 13 is an end view of the form shown in Fig. 12.

Referring to Figs. 1 through 6 of the drawings, according to one embodiment of the invention the device may comprise a body member 1 provided with a hopper or receptacle portion 2 and a socket 3 adapted to operatively engage a suitable standard or a support provided on the power supply for the device, which may comprise a conventional power-driven kitchen accessory appliance, the driven shaft of which is indicated at 4 in Fig. 3.

In order to provide for driving the cutter element with which the device is provided, we provide a gear train 5 disposed within a gear housing 6 which is secured to the body member 1 through an attachment screw 7 terminating in a wing nut 7', and provided with a locking member 8 engaging a recess 9 in the shaft 10 carrying the cutter assembly 11. This construction provides operative connection between the driving shaft 4 and the driven shaft 10 of the cutter assembly.

The cutter assembly comprises an auger 13, which may be provided with a double flight screw construction as indicated at 14, mounted within the receptacle 2 and having its outer end extending downwardly into a cylindrical recess 15 in the base of the body member 1, said recess being provided with outwardly directed restricted openings or fluid passages 16 in the side wall thereof through which juice may be discharged during operation of the device. The cutter assembly further comprises an external cutter sleeve 17, provided with a plurality of peripherally disposed outwardly directed gouge or blade members 18 extending in one or more suitably arranged series from top to bottom of the sleeve 17. The sleeve 17 is preferably of less length than the auger 13, and covers the auger for the major portion of its length at the inner end thereof, being stopped short of the cylindrically recessed portion 15, wherefore the auger projects downwardly beyond the lower end of said sleeve. The auger 13 and the cutter sleeve 17 are secured together as through bayonet attachment to one another at the respective upper or inner ends thereof, as illustrated more particularly at 19 in Fig. 6, and the sleeve 17 and auger 13 are adapted to be rotated as a unit, on an axis defined by the shaft 10.

The auger 13 and sleeve 17 are mounted in concentric spaced relation throughout the principal proportion of the length of said sleeve, and within the space therebetween we dispose a fixed feeding member 21 which may comprise an upper sleeve member 22, a lower sleeve member 23, and longitudinally extending feeder bars 24 extending between said upper and lower sleeve members. This feeding member is disposed in fixed relation with respect to the body member 1 of the device, as through the agency of a pair of diametrically disposed lugs 25 projecting outwardly from the lower end of the member and adapted to engage recesses 26 cooperatively disposed in the body member 1.

At the lower end of the auger 13 an extrusion head 28 is provided, through which the pulp is extruded during operation of the device, and this extrusion head may comprise a cup-shaped member provided with a plurality of radial slots 29 and a rim portion 28' adapted to bear against the lower edge of the lower sleeve 23 of the feeding member 21. The auger 13 is centered for rotation within the extrusion head 28 through the agency of a stub shaft 31 secured to the lower end of said auger, and extending through a bore 32 in the head 28. The lower end of the auger 13 is preferably tapered down to approximately the size of the shaft 31, as indicated at 13' in Figs. 3 and 5, and the inner face of the head 28 is preferably correspondingly tapered, as at 28", to facilitate the comminution of the pulp and the ready discharge thereof through the slots 29. In order to further assist in the comminution of the pulp, we preferably provide a plurality of upwardly directed cutting teeth 27 on the upper edge of the lower sleeve 23 of the member 21, and a plurality of cutting teeth intermediate the positions of the respective slots 29 in the extrusion head 28, as at 33.

The cutting head 28 and sleeve 21 are held in position within the body portion 1 of the device through the agency of a threaded sleeve or collar 34 provided with a shoulder 34' bearing against the rim 28' of the cutting head. We may also provide a tubular chute below the position of the extrusion head 28, as at 34" so that the pulp extruded through said head may more readily be directed into a suitable receptacle.

In Fig. 7 we have illustrated a modification of the feeding sleeve shown at 21 in Figs. 1 through 6, comprising an upper sleeve 35, a lower sleeve 36, a plurality of longitudinal feeder bars 37 which correspond in function to the feeder bars 24 in Fig. 6 and are curved longitudinally in the direction of rotation of the auger 13. The helical disposition of the longitudinal feeder bars 37 provides slightly different operating characteristics for the device and this construction may be considered preferable for some types of fruit or vegetables. This feeder device may be provided with outwardly projecting lugs 38 corresponding to the lugs 25 aforesaid, which may engage the recesses 26 in the body member in the same manner as was described in connection with the first form of the device.

The helical disposition of the feeder bars 37 serves to further the compression of the pulp as it passes downwardly along the threads 14 of the auger 13, due to the fact that the angle between the bars 37 more nearly approaches a perpendicular to the path of material disposed within and along the threads 14, and by this construction the device may be caused to express a greater quantity of juice from a given pulp. The provision of axially extending longitudinal feeder bars, as at 24 in the first described form of the invention, however, has been found adequate for most fruits and vegetables encountered in the ordinary household. It will further be appreciated that as the blades 18 (or the cooperating blades 47 and 48 of the form of cutter shown in Figs. 10 and 11) engage the fruit or vegetable and gouge cuttings or strips therefrom, the cuttings are forced interiorly of the sleeve 17, and as a particular blade 18 passes over the position of the longitudinal feeder bars, as at the position A in Fig. 6, the cutting or strip of the fruit or vegetable will be severed by such feeder bar owing to the close spacing of such feeder bar between the sleeve 17 and the ridges on the auger 13. It is therefore apparent that the effective length of the cuttings produced by the device and fed downwardly toward the discharge end thereof along the threads 14 of the auger 13 may be established at any desired value by providing a corresponding circumferential spacing of successive longitudinal feeder bars. For example, the assembly of feeder bars shown in the Fig. 7 form, will cut off strips of the fruit or vegetable which are somewhat less than one-half as long as the strips cut by assembly of feeder bars 24 shown in Fig. 6.

In Figs. 8 and 9 we have illustrated a modified form of extrusion head, which comprises essentially an outboard bearing for the stub shaft 31 formed at the lower end of the auger 13. Referring particularly to Fig. 8, an upper sleeve 39 corresponding to the sleeve 22, a lower sleeve 41 corresponding to the sleeve 23, and longitudinal feeder bars 42 corresponding to the bars 24, are provided, together with a transversely extending bearing member 43 provided with a longitudinal bore 44 adapted to receive said stub shaft. Lugs 45 may be provided corresponding to the lugs 25 and 38, if desired. The bearing 43 may be secured integrally within the lower sleeve 41, if desired, or may be removably disposed therein. With such removable construction, the bearing 43 may be substituted for the extrusion head 28, without modification of the feeding sleeve, if desired. This particular design of feeder device is adaptable for use when the culinary device is intended merely to grate a fruit or vegetable, and the omission of the extrusion head 28 from the assembly relieves the back pressure on the pulp carried downwardly through the body member through the agency of the auger 13 and the longitudinal feeder bars, wherefore the pulp is discharged through the spaces at the sides of the transversely extending bearing member 43 in the form of a well-comminuted material, with the substantial absence of the formation of juice.

In Figs. 10 and 11 we have illustrated a modified form of outer sleeve, corresponding in function to the sleeve 17 in the first-described form of the invention, consisting essentially of a cylindrical member 46 provided with a helically disposed longitudinal cutting blade 47 and one or more series of peripherally arranged outwardly projecting knife members 48, the latter elements 47 and 48 cooperating to cut the fruit or vegetable into thin strips which are cut away from such fruit or vegetable by the blade 47 and fed inwardly of the sleeve 46 through a slot 49 formed adjacent the position of said blade 47. The sleeve 46 is adapted to be secured to the auger 13 in the same manner as is the sleeve 17, as through the agency of a bayonet slot 50 formed in the upper end thereof. The outwardly projecting knives 48 may be formed by punching the same outwardly from the wall of the sleeve member 46, as indicated at 48', and the cutting edges may be swaged slightly in the punching operation so that actual sharpening of these knives will not be necessary.

When an outer sleeve of the type shown in Figs. 10 and 11 is employed in the construction of Figs. 1 to 6, we preferably incline the outwardly projecting knives 48 in a helical fashion, for example, as illustrated in Fig. 10, so that as the knives engage the fruit or vegetable within the hopper 2 the inclination of such knives will tend to cause the fruit or vegetable to be forced downwardly within the hopper, the sloping side walls of which will react to force the fruit or vegetable into more close engagement with the blade member 47 and thus facilitate the self-feeding characteristics of the construction. The direction of inclination of the blades or knives 48 will depend upon the direction of rotation of the cutting assembly, and will correspond to the direction of inclination of the threads 14 on the auger 13.

The form of device illustrated in Figs. 12 and 13 corresponds essentially to that shown in Figs. 1 to 6, with the exception that the device is disposed in a horizontal direction instead of vertical. This device may comprise a housing member 51 provided with a receptacle or chute 52 adapted to receive the fruit or vegetable under treatment, and a rotary cutting assembly disposed within the body member and adapted to rotate on a horizontal axis through the agency of a suitable gear assembly in operative association with the drive shaft 53 corresponding to the drive shaft 4 aforesaid. The cutter assembly may comprise an outer sleeve 54 corresponding to the sleeve 17, a feeder element 55 corresponding to the feeder member 21, an auger 56 corresponding to the auger 13, together with suitable provision for maintaining the feeder member 55 in fixed relation during rotation of the sleeve 54 and auger 56. The device may be provided with an extrusion head 57 of the type shown at 28, for example, which is held in place through the agency of a threaded lock collar 58. The bottom wall of the body member may be provided with a plurality of juice openings 59, corresponding to the openings 16, and a suitable chute or funnel-like member may be provided below such openings as at 61, terminating in a discharge spout 62.

The manner of use of the two forms of device shown is substantially comparable, and referring to the form shown in Figs. 1 through 6 the fruit or vegetable in suitable small pieces is supplied to the receptacle 2. The cutter assembly 11 is rotated by operation of the motor with which the shaft 4 is associated, causing the cutter assembly to rotate in a counter-clockwise direction, as shown in Fig. 4, whereby the scoop element 18 will engage the surface of the fruit and scoop shavings therefrom, which shavings are led interiorly of the sleeve 17 into the screw channels or threads 14 of the auger 13. As the material so scraped or cut away from the fruit or vegetable is rotated within the cutter assembly, it will be thrown outwardly by centrifugal force and will engage the longitudinal feeder bars 24 associated with the cutter assembly, causing the material to work downwardly within the threads 14. As the material approaches the lower end of the auger 13, and particularly when the material enters the conical space immediately above the extrusion head 28, the material is compacted upon itself and the material is chopped by the action of the flutes 14 and the cutting teeth 27 and 33 on the feeder member 21 and extrusion head 28, respectively; and comminuted material is expressed from the device through the slots 29. Due to the action of the feeder bars on the pulp as it passes downwardly through the flutes 14, serving to crowd the pulp downwardly at a rate greater than the extrusion rate through the head 28, and the pressure on the pulp is thus gradually increased, serving to express the juice from the pulp, which juice passes from the device through the opening 16. A suitable spout member may be provided below the opening 16, as shown at 65 in Fig. 2, to direct the juice into a suitable receptacle.

As above described, where a cutting sleeve of the type shown at 46 is employed, the preferred helical inclination of the outwardly projecting blades 48 will serve to crowd the fruit or vegetable downwardly within the hopper 2, and it will be appreciated that the same effect may be secured with the type of cutting sleeve shown in Figs. 1 to 6 by forming the gouges or blades 18 in such manner as to exert a downward thrust on such fruit or vegetable as will be apparent to any skilled mechanic. It has been found that for best performance of the construction the outer sleeve 17 is spaced from the auger 13 by an amount only sufficient to allow free passage of the longitudinal feeder bars 24 therebetween. The pulp forced into the space between the auger 13 and the outer sleeve 17 has been found to compact quite closely between auger and sleeve and the longitudinal feeder bars 24 serve to hold the pulp back against concurrent rotation with the auger and sleeve to a sufficient extent that the auger has a marked screw action on such pulp, which is even more effective than the screw action which would be obtainable if the auger were rotated within a fixed outer cylindrical sleeve.

When a bearing member of the type shown at 43 is substituted for the extrusion head of the type shown at 28 or 57, the back pressure on the pulp lying within the threads 14 is materially diminished, and the pulp is consequently expressed through the openings 43a at the sides of the transversely extending outboard bearing member, without undue loss of juice. The device in such an embodiment comprises essentially a grating device serving merely to comminute the fruit and vegetable at a comparatively rapid rate.

While the device of the present invention is intended primarily as a fruit or vegetable juicer or grater, it has been found to be highly effective as a meat grinder. The expression "culinary comminuting device", as used herein, therefore, will be interpreted as applying equally to the device, whether it be employed to juice a fruit or vegetable, to grate a fruit or vegetable, or to grind meat or the like. Other embodiments and modifications of the construction will be apparent to those skilled in the art and we do not consider our invention limited to the specific forms herein delineated and described but rather to the scope of the subjoined claims.

We claim:

1. A culinary comminuting device, which comprises: a body member defining a receptacle and provided with a cylindrical recess communicating therewith; an elongated auger member rotatably mounted on said body member within said receptacle, said auger member having an outer end portion extending axially into said recess; a cutting sleeve disposed concentrically about said auger member and extending over the major portion of the length thereof at the inner end thereof and rotatable therewith, said cutting sleeve being spaced concentrically outwardly from said auger member and being provided with peripherally disposed cutting means arranged along its length, and said auger member and said cutting sleeve comprising a cutter assembly; a feeding member disposed in the space between said auger member and said cutting sleeve and comprising a plurality of elongated feeder bars fixed with respect to said body member and extending longitudinally with respect to the axis of rotation of said cutter assembly; and means for rotating said cutter assembly.

2. A culinary comminuting device, which comprises: a body member defining a receptacle and provided with a cylindrical recess communicating therewith; an elongated auger member rotatably mounted on said body member within said receptacle, said auger member having an outer end portion extending axially into said recess, said body member being provided with a plurality of restricted openings in the side wall thereof at the position of said cylindrical recess; a cutting sleeve disposed concentrically about said auger member and extending over the major portion of the length thereof at the inner end thereof and rotatable therewith, said cutting sleeve being spaced concentrically outwardly from said auger member and being provided with peripherally disposed cutting means arranged along its length, and said auger member and said cutting sleeve comprising a cutter assembly; an extrusion head disposed at the end of said cylindrical recess removed from said receptacle and closely spaced from the outer end of said auger member; a feeding member disposed in the space between said auger member and said cutting sleeve and comprising a plurality of elongated feeder bars fixed with respect to said body member and extending longitudinally with respect to the axis of rotation of said cutter assembly; and means for rotating said cutter assembly.

3. A device as set forth in claim 2, said extrusion head constituting a bearing member for said auger member, serving to maintain said auger member in axial alignment within said recess.

4. A device as set forth in claim 2, said feeding member being provided with a sleeve porton extending circumferentially about said auger member at the outer end thereof, and said sleeve portion being provided with a plurality of cutting teeth directed toward the inner end of said auger member.

5. A culinary comminuting device, which comprises: a body member defining a receptacle and provided with a cylindrical recess communicating therewith; an elongated auger member rotatably mounted on said body member within said receptacle, said auger member having an outer end portion extending axially into said recess, and said body member being provided with a plurality of restricted openings in the side wall thereof at the position of said cylindrical recess; a cutting sleeve disposed concentrically about said auger member and extending over the major portion of the length of said auger member at the inner end thereof and rotatable therewith, said cutting sleeve being spaced concentrically outwardly from said auger member and being provided with peripherally disposed cutting means arranged along its length, and said auger member and said cutting sleeve comprising a cutter assembly; an extrusion head disposed at the end of said cylindrical recess removed from said receptacle and closely spaced from the outer end of said auger member; a feeding member disposed in the space between said auger member and said cutting sleeve and comprising a plurality of elongated feeder bars fixed with respect to said body member and extending longitudinally with respect to the axis of rotation of said cutter assembly; and means for rotating said cutter assembly, said auger member having an outwardly tapering conical configuration at its outer end and said extrusion head being provided with a cooperatively shaped conical recess in closely spaced relation thereto.

6. A device as set forth in claim 5, said extrusion head being provided with a plurality of peripherally disposed cutting teeth located circumferentially about said auger member near the outer end thereof and directed toward the inner end thereof, in position to cooperate with said auger member to comminute material fed outwardly toward said extrusion head by said auger member.

7. A device as set forth in claim 5, said extrusion head being provided with a plurality of peripherally disposed cutting teeth located circumferentially about said auger member near the outer end thereof and directed toward the inner end thereof, in position to cooperate with said auger member to comminute material fed outwardly toward said extrusion head by said auger member, and said feeding member being provided with a sleeve portion extending circumferentially about said auger member at the outer end thereof and spaced toward the inner end of said auger member from the position of said cutting teeth on said extrusion head, and said sleeve portion being provided with a plurality of cutting teeth directed toward the inner end of said auger member.

8. A culinary comminuting device, which comprises: a body member defining a receptacle and provided with a cylindrical recess communicating therewith; an elongated auger member rotatably mounted on said body member within said receptacle, said auger member having an outer end portion extending axially into said recess; a cutting sleeve disposed concentrically about said auger member and extending over the major portion of the length of said auger at the inner end thereof, said cutting sleeve being rotatable with said auger member and spaced concentrically outwardly from said auger member over the major portion of its length and provided with a longitudinally extending outwardly projecting cutting blade and an elongated material-receiving opening adjacent said blade, together with a plurality of peripherally arranged outwardly projecting knife members disposed in advance of said cutting blade with respect to the direction of rotation of said cutting sleeve, and said auger member and said cutting sleeve comprising a cutter assembly; a feeding member disposed in the space between said auger member and said cutting sleeve and comprising a plurality of elongated feeder bars fixed with respect to said body member and extending longitudinally with respect to the axis of rotation of said cutter assembly; and means for rotating said cutter assembly.

9. A device as set forth in claim 8, said projecting knife members on said cutting sleeve being inclined with respect to the axis of said cutting sleeve along helically arranged paths extending from the outer end to the inner end of said sleeve in the direction of rotation thereof and adapted to engage material within said receptable and force the same toward the outer end of said sleeve.

10. A culinary comminuting device, which comprises: a body member defining a receptacle and provided with a cylindrical recess communicating therewith; an elongated auger member rotatably mounted on said body member within said receptacle said auger member having an outer end portion extending axially into said recess; a cutting sleeve disposed concentrically about said auger member and extending over the major portion of the length of said auger member at the inner end thereof and rotatable therewith, said cutting sleeve being spaced concentrically outwardly from said auger member and being provided with peripherally disposed cutting means arranged along its length, and said auger member and said cutting sleeve comprising a cutter assembly; a feeding member disposed in the space between said auger member and said cutting sleeve and comprising a plurality of elongated feeder bars fixed with respect to said body member and extending longitudinally with respect to the axis of rotation of said cutter assembly, said elongated feeder bars being arranged in a helical configuration extending from the inner end of said auger member toward the outer end thereof in the direction of rotation of said cutter assembly.

JOHN A. WALLER.
CHARLES E. MOCKBEE.